United States Patent [19]

Narula et al.

[11] Patent Number: 5,210,062
[45] Date of Patent: May 11, 1993

[54] ALUMINUM OXIDE CATALYST SUPPORTS FROM ALUMINA SOLS

[75] Inventors: Chaitanya K. Narula, Ann Arbor, Mich.; William L. H. Watkins, Toledo, Ohio; Mordecai Shelef, Birmingham, Mich.

[73] Assignee: Ford Motor Company, Dearborn, Mich.

[21] Appl. No.: 750,174

[22] Filed: Aug. 26, 1991

[51] Int. Cl.[5] .......................... B01J 37/02; B01J 35/10
[52] U.S. Cl. ..................................... 502/304; 502/341
[58] Field of Search ........................ 502/355, 304, 341

[56] References Cited

U.S. PATENT DOCUMENTS

| | | | |
|---|---|---|---|
| 3,019,080 | 1/1962 | Vincent | 23/143 |
| 3,873,469 | 3/1975 | Foster et al. | 423/285 |
| 3,944,658 | 3/1976 | Yoldas | 502/355 |
| 4,241,035 | 12/1980 | Farmer | 423/327 |
| 4,438,219 | 3/1984 | Brandenburg et al. | 502/355 |
| 4,631,268 | 12/1986 | Lachman et al. | 502/439 |
| 4,714,694 | 12/1987 | Wan et al. | 502/304 |
| 4,717,708 | 1/1988 | Cheng et al. | 502/233 |
| 4,732,879 | 3/1988 | Kalinowski et al. | 502/5 |
| 4,771,029 | 9/1988 | Pereira et al. | 502/355 |

FOREIGN PATENT DOCUMENTS

| | | | |
|---|---|---|---|
| 225953 | 6/1987 | European Pat. Off. | 502/305 |
| 62-149338 | 7/1987 | Japan . | |
| 2-063551 | 3/1990 | Japan . | |

OTHER PUBLICATIONS

Yoldas, "Alumina Gels That Form Porous Transparent $Al_2O_3$", *Journal of Materials Science* 10 (1975) 1856–1860.

Leenaars et al, "Porous Alumina Membranes", *Chemtech* (Sep. 1986) 560–564.

Leenaars et al, "The Preparation and Characterization of Alumina Membranes with Ultra-Fine Pores, Part 1 Microstructural Investigations on Non-supported Membranes", *Journal of Materials Science* 19 (1984) 1077–1088.

Leenaars et al, "The Preparation and Characterization of Alumina Membranes with Ultra-Fine Pores, 2. The Formation of Supported Membranes", *Journal of Colloid and Interface Science*, vol. 105, No. 1, May 1985.

Leenaars et al, "The Preparation and Characterization of Alumina Membranes with Ultra-Fine Pores, Part 3. The Permeability For Pure Liquids", *Journal of Membrane Science*, 24 (1985) 245–260.

Leenaars et al, "The Preparation and Characterization of Alumina Membranes with Ultra-Fine Pores, Part 4. Ultrafiltration And Hyperfiltration Experiments", *Journal of Membrane Science*, 24 (1985) 261–270.

*Primary Examiner*—Carl F. Dees
*Attorney, Agent, or Firm*—Joseph W. Malleck; Roger L. May

[57] ABSTRACT

This invention is directed to a method of providing a channeled substrate with a porous washcoat used as a supporting structure for a catalyst. The substrate is coated with a reactive mixture made of components comprising aluminum alkoxide, water, and acid or the alkoxide in an alcohol. The aluminum alkoxide contains hydrolyzable alkoxy groups and has the chemical formula: $Al(OR)_3$, where R is an alkyl or branched alkyl group of 3 to 6 carbon atoms. The method also includes drying and calcining the coating to form a $\gamma$-alumina washcoat.

18 Claims, 3 Drawing Sheets

PRIOR ART

ALUMINUM OXIDE CATALYST SUPPORTS FROM ALUMINA SOLS

BACKGROUND OF THE INVENTION

1. Technical Field

This invention is related to a the art of providing a channeled substrate with a porous washcoat comprising γ-alumina for use as a support for an exhaust gas catalyst.

2. Discussion of the Related Art

Automotive catalytic converters are employed to catalyze desired reactions of exhaust gases that pass through the converter. These converters generally comprise a honeycomb ceramic substrate coated with a washcoat of γ-alumina impregnated with a catalyst. According to a current method for providing the washcoat on the substrate, it is repeatedly dipped in a suspension of γ-alumina, baria, and ceria to form a coating which is subsequently calcined at an elevated temperature. Initial dippings of the substrate cause large amounts of washcoat to settle in the corners of the honeycomb channels. Additional dippings result in substantially narrowed channels which become circular in shape. The alumina in the corners is not accessible to the exhaust gases during converter operation and hence serves no use to the catalyst. Further, the channels are significantly narrowed. During converter use, this narrowing of the channels is sufficient to cause a back pressure within the converter. This back pressure has a marked detrimental impact on the operation of the converter in that it impedes the flow of the exhaust gases through the converter.

The present invention overcomes the disadvantages described above by providing such a washcoat from a reactive mixture made from components comprising a particular aluminum alkoxide. On such alkoxide, i.e., aluminum tris(sec-butoxide), is disclosed as being useful to make membrane films by a sol/gel technique in "Porous Alumina Membranes", A. Leenaars, K. Keizer and A. Burggraaf, Chemtech, September, 1986, p. 560–564. The membrane films are disclosed as being useful for separating materials, e.g., hydrogen or helium from other gases. No disclosure is made therein to use the aluminum tris(sec-butoxide) in a washcoat on a channeled substrate as an exhaust gas conversion catalyst support.

SUMMARY OF THE INVENTION

This invention overcomes the above disadvantages and is directed to a method of providing a particular washcoat on a channeled substrate as a supporting structure for an exhaust gas conversion catalyst. The method includes first applying a coating of a reactive mixture on the channeled substrate. The coating on the substrate is dried at a temperature suitable to remove water present in the coating, preferably at or below about 100° C. The method also includes calcining the coating at a temperature greater than about 300° C., preferably between about 300° and 900° C., to densify the coating and convert it to γ-alumina. The method may comprise repeatedly applying and drying the coating followed by calcining or doing all three steps until a coating of desired surface area is obtained. Preferably, the γ-alumina washcoat additionally comprises barium oxide, cerium oxide or mixtures thereof.

The reactive mixture is made according to a first embodiment from aluminum alkoxide dissolved in alcohol vaporizable at or below 100° C., preferably its parent alcohol, and according to a second embodiment from aluminum alkoxide, water, and acid. The aluminum alkoxide has a chemical formula of $Al(OR)_3$, wherein R comprises an alkyl group, branched alkyl group, or aryl group of between 3 and 6 carbon atoms. In the second embodiment wherein the reactive mixture is made from aluminum alkoxide and alcohol, the coating is exposed to water vapor prior to drying. In either situation, after the step of applying a coating to the channeled substrate the channels are gas blown to remove excess coating.

This invention, in another aspect, is also directed to the product resulting from the practice of the invention method disclosed herein.

DETAILED DESCRIPTION AND BEST MODE

Figure 1:
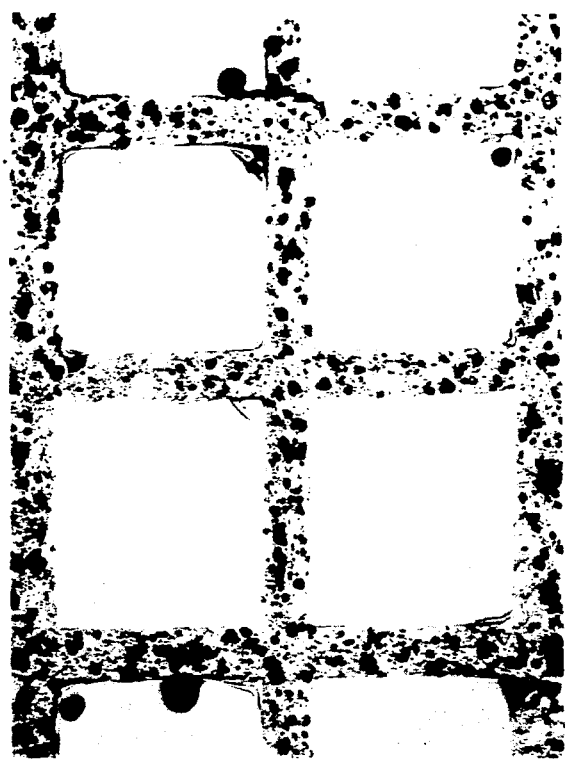
FIG. 1 is an optical micrograph of a washcoat/catalyst on a honeycomb substrate where the washcoat is provided according to a first embodiment the present invention.

The invention is directed to a method for providing a washcoat comprising γ-alumina on a channeled substrate, e.g., a ceramic honeycomb structure used in catalytic converters. The washcoat is used as a supporting structure for an exhaust gas catalyst.

According to a first embodiment of the invention, a reactive mixture is made by combining a certain type of liquid aluminum alkoxide containing hydrolyzable alkoxy groups with water and acid, generally with stirring, wherein a suspension is formed. The aluminum alkoxide useful with this invention has the chemical formula: $Al(OR)_3$, wherein R comprises an alkyl group, branched alkyl group, or aryl group having between 3 and 6 carbon atoms. Exemplary of suitable aluminum alkoxides which may be used in this invention include, but are not limited to, ethoxides, (n-, or iso) propoxides, (n, sec, or tert-) butoxides, or (n, sec, or tert-) amyloxides such as tris(2-propoxide), tris(2-amyloxide, tris tert-butoxide), and tris(sec-butoxide), with the latter butoxide being preferred. Compatible mixtures of such alkoxides may also be employed.

The aluminum alkoxide is combined with the water in at least an amount sufficient to allow for essentially complete hydrolysis of the alkoxide. Preferably, the ratio of water to alkoxide employed to form the mixture is between about 1.8 and 2.2 liters of water to moles of alkoxide, more preferably this ratio is about 2. This ratio can be varied, however, outside that disclosed above. Using greater amounts of water per mole of alkoxide results in an alumina of smaller particle size as would be apparent to one skilled in the art. When the alkoxide is added to water, the alkoxide hydrolyzes. The parent alcohol of the alkoxide may also be employed as a partial solvent in the reaction mixture. After mixing the alkoxide with the water, the mixture is allowed to stand, for example at room temperature, during which time further hydrolysis takes place. It may be desirable to heat the reactive mixture to encourage hydrolysis of the aluminum alkoxide. Preferably the alkoxide is added to water which is at an elevated temperature, e.g., 80° C.

Acid is added to the reactive mixture preferably in only a minimal amount as is necessary to provide a clear sol. The reaction mixture is preferably at an elevated temperature when the acid is added. Any acid may be employed in the practice of this invention; many are readily commercially available. Exemplary acids include, but are not limited to, acetic, trifluoracetic, formic, oxalic, nitric, hydrochloric, and compatible mixtures thereof.

Hydrolysis of the aluminum alkoxide in the reactive mixture generates alcohol in the reactive mixture. It is generally desirable to remove at least a portion, if not substantially all, of the alcohol so formed from the reactive mixture and any parent alcohol which may have been used as solvent. This can be accomplished by subjecting the reactive mixture to heating to boil off the alcohol.

The reactive mixture may further comprise other components such as compatible salts of materials like barium and cerium. These components could be, e.g., alkoxides, nitrates, acetylacetonates, etc. of barium and cerium which would also form oxides thereof in the washcoat. Generally, barium or cerium would be added as a barium alkoxide or cerium alkoxide. The alkoxide groups would preferably contain 3 to 7 carbon atoms. The presence of barium oxide and cerium oxide in the washcoat improves the high temperature stability of the washcoat and the oxidation efficiency of the catalyst during use.

The general method of forming the reactive mixture described above is associated with the technology generally described as "sol-gel". More detailed information concerning formation of sol-gels is contained in the reference is C. J. Brinker & G. W. Scherer, J. Non-Crystall. Solids, 70, 301-322 (1988).

The reactive mixture is applied to the channeled substrate to form a supporting structure for an exhaust gas catalyst. The channels can be one or more of a variety of cross-sectional shapes and sizes. The cross-sectional shape of the channels can be, for example, a trapezoid, rectangle, or square; a repeating pattern of such cross-sections can be described as a honeycomb structure. The channels may be parallel or generally parallel and extend through the substrate from one side to an opposite side, such channels being separated from one another by preferably thin walls. The channels may also be multidirectional and may even communicate with one or more adjacent channels. The substrate is made preferably of a substantially chemically inert, rigid, solid material capable of maintaining its shape and strength at high temperatures. The substrate may be metallic or ceramic in nature or a combination thereof. Exemplary materials are alpha-alumina, cordierite, cordeirite-alpha alumina, and zirconium silicate. Still other suitable materials for the substrate will be apparent to those skilled in the art in view of the present disclosure. Preferably, the substrate is a honeycomb ceramic structure.

The mixture may be applied to the substrate by any suitable technique, including spraying or dipping. If the substrate is dipped into the mixture, after withdrawing it from the mixture, the channels of the honeycomb structure would generally be gas (e.g., air/nitrogen) blown to open the channels and remove excess coating. This leaves a very thin coating of the reactive mixture on the substrate. The coating is then subjected to drying at a temperature suitable to evaporate any solvents including water from the coating, that temperature preferably being about 100° C. or less. This essentially removes any solvent present in the coating. Thereafter, the coating is calcined to densify the coating and form aluminum oxide. The calcination temperature generally is between about 300° and 900° C., often about 600° C. when the catalyst support is to be used for automotive applications. Generally, in order to provide a supporting structure for the catalyst of sufficient surface area, the substrate would be subjected to repeated coating and drying and then afterwards to a final calcining. If the substrate is rested on its side during drying, the substrate is preferably rotated 90° with each successive drying so that is rested on a different side to obtain the most uniform washcoat. Alternately, the dipping, drying and calcining can be repeated in sequence until a washcoat of desired surface area is obtained. Generally, it is then desirable to subject the resultant coating to a lengthier calcination.

According to a second embodiment of the present invention, the reaction mixture is made from the certain type of liquid aluminum alkoxide disclosed above dissolved in alcohol vaporizable at or below about 100° C., preferably being the parent alcohol of the alkoxide. For example, one such reaction mixture comprises aluminum tris-(2-propoxide) dissolved in 2-propanol. The reaction mixture comprises the alkoxide and alcohol preferably in amounts which provide 0.8 to 1.2 molar solutions, more preferably about 1.0 molar solutions of the alkoxide. The reactive mixture may further comprise other components, e.g., compatible salts of materials like barium and cerium as disclosed for the first embodiment. Preferably, in either embodiment if barium and/or cerium are to be incorporated in the γ-alumina washcoat, they would be incorporated by subjecting the calcined γ-alumina washcoat on the substrate to a solution of a barium or cerium salt, e.g., cerium nitrate. Afterwards, the washcoat would again be calcined.

Because the reactive mixture of aluminum alkoxide is sensitive to moisture, its formation is desirably carried out in a substantially moisture free environment. The reactive mixture is applied to a channeled substrate of type described previously herein by any suitable technique, including spraying or dipping. After application of the reactive mixture, the channels of the structure would preferably be gas blown (e.g., nitrogen) to remove excess reaction mixture. The reactive mixture coating is subsequently exposed to water vapor, e.g., moist air, sufficient to cause hydrolysis of the alkoxide. The coating is then subjected to drying along the lines of the procedure used in the first embodiment disclosed herein. During both exposure to humidity and drying, the substrate is preferably rested on a different consecutive side to encourage uniform coating. Thereafter, the coating is calcined to densify the coating and form aluminum oxide. The calcination temperature generally is between about 300° and 900° C., often about about 600° C. when the catalyst support is to be used for automotive applications. The substrate may be subjected to repeated coating, humidity, drying and afterwards to a final calcining. Alternately, the dipping, drying, exposing to water vapor, and calcining can be repeated in sequence until a washcoat of desired surface area is obtained. Generally, it is then desirable to subject the resultant coating to a lengthier calcination.

Coatings according to the present invention desirably have surface areas of at least 25 m²/g in order to provide adequate surface area for the catalyst. Advantageously, according to the present invention such high surface area is provided with less loading of washcoat on the substrate. For example, while 33% by weight of a conventional washcoat made by dipping the substrate in a dispersion of γ-alumina, baria and ceria is required to achieve a desired surface area of 25–30 m²/g of total substrate/washcoat weight, a washcoat made according to the present invention method of 14.7% by weight provides the same surface area. Consequently, the invention washcoat provides decreased washcoat material without a corresponding decrease in the surface area of the washcoat. Hence, the channels of a honeycomb substrate uniformly coated according to the present invention will maintain markedly more of their openness while at the same time providing a desired surface area of washcoat so that catalyst effectiveness is maintained. The back pressure problem associated with the narrowing of the channels thus is substantially eliminated for more efficient operation of the catalytic converter.

It is believed that using the specific sol-gel technique of this invention provides a coating on the substrate comprising particles smaller in diameter than those provided from conventional coating systems. It is believed this allows the formed coating to be thinner and avoid excessive buildup in channel corners experienced with conventional washcoats.

Figure 2:
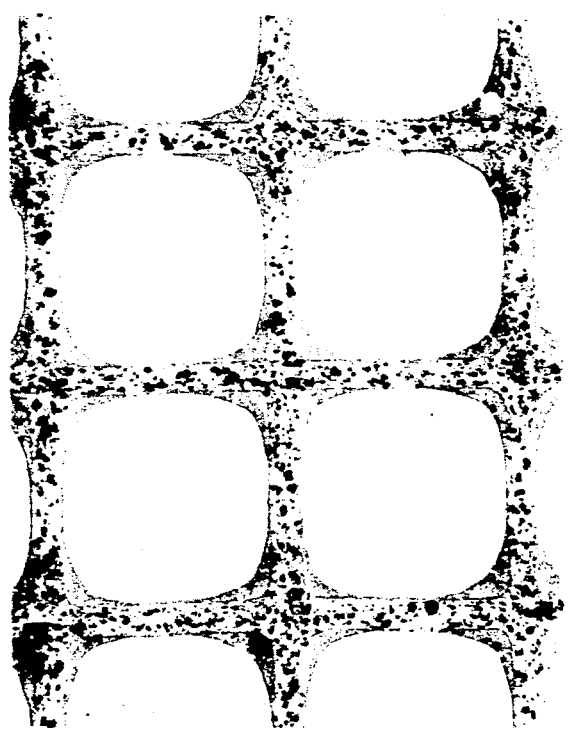
FIG. 2 is an optical micrograph of a commercially available washcoat/catalyst on a similar honeycomb substrate.

FIG. 1 shows an optical micrograph of a washcoat on a honeycomb substrate prepared according to the first embodiment of the present invention. For comparison, FIG. 2 shows an optical micrograph of a commercial washcoat on a similar honeycomb structure at the same magnification. FIG. 1 shows channels which are clearly more open and presents only a thin uniform layer of washcoat. In contrast, the commercial washcoat is non-uniform and thicker so that the channel volume is considerably decreased.

The washcoat formed on the substrate according the present invention is advantageously used as a supporting structure for an exhaust gas-conversion catalyst, i.e., catalyst to convert exhaust gases to more desirable gases. The catalyst may be provided into the washcoat by any suitable means, e.g., by contacting the porous calcined washcoat with an aqueous solution of a catalyst or mixture of catalysts. Generally, precious metals are used as exhaust gas catalysts. Exemplary of precious metals are palladium, platinum, rhodium and iridium. For example, nitrates of such metals may be used to prepare an aqueous solution of a catalyst used to impregnate the porous washcoat. The exhaust gas to be treated may be that generated by internal combustion engines such as automobile engine.

EXAMPLE 1

Aluminum tris(sec-butoxide), 9.85 g, is added to distilled water, 80 ml, at 80° C. with stirring. A white precipitate immediately forms which remains in suspension with stirring. The suspension is kept at 90° C. for 1 hour, and then nitric acid (2.8 ml of 1M) solution is added to the suspension. The alumina sol so formed is boiled in an open flask to evaporate sec-butonal which forms from the hydrolysis of the butoxide. After removal of the butanol from the flask, the sol is kept at 90° C. for 16 hours.

A piece of honeycomb substrate is dipped into the sol and after withdrawing the substrate, the channels are emptied by blowing air through them. The coating is converted to a gel on the substrate when it is dried at 80° C. for about 15 minutes. The dipping, blowing and drying is repeated until no further weight increase is recorded. This appears to be due to the equilibrium between the gel on the substrate and the sol into which the substrate is being dipped. After calcination at 600° C. for 4 hours (which can be as short as 30 minutes), the coated substrate is cooled to room temperature. On calcination, the gel coating densifies and converts to γ-alumina. The process of dipcoating and calcination was repeated to obtain a washcoat of 14.7% by weight. The coating is then further calcined for 12 hours at 600° C. The surface area of the resulting washcoat is found to be 25 m²/g. The coating is substantially uniform in thickness.

Figure 3:
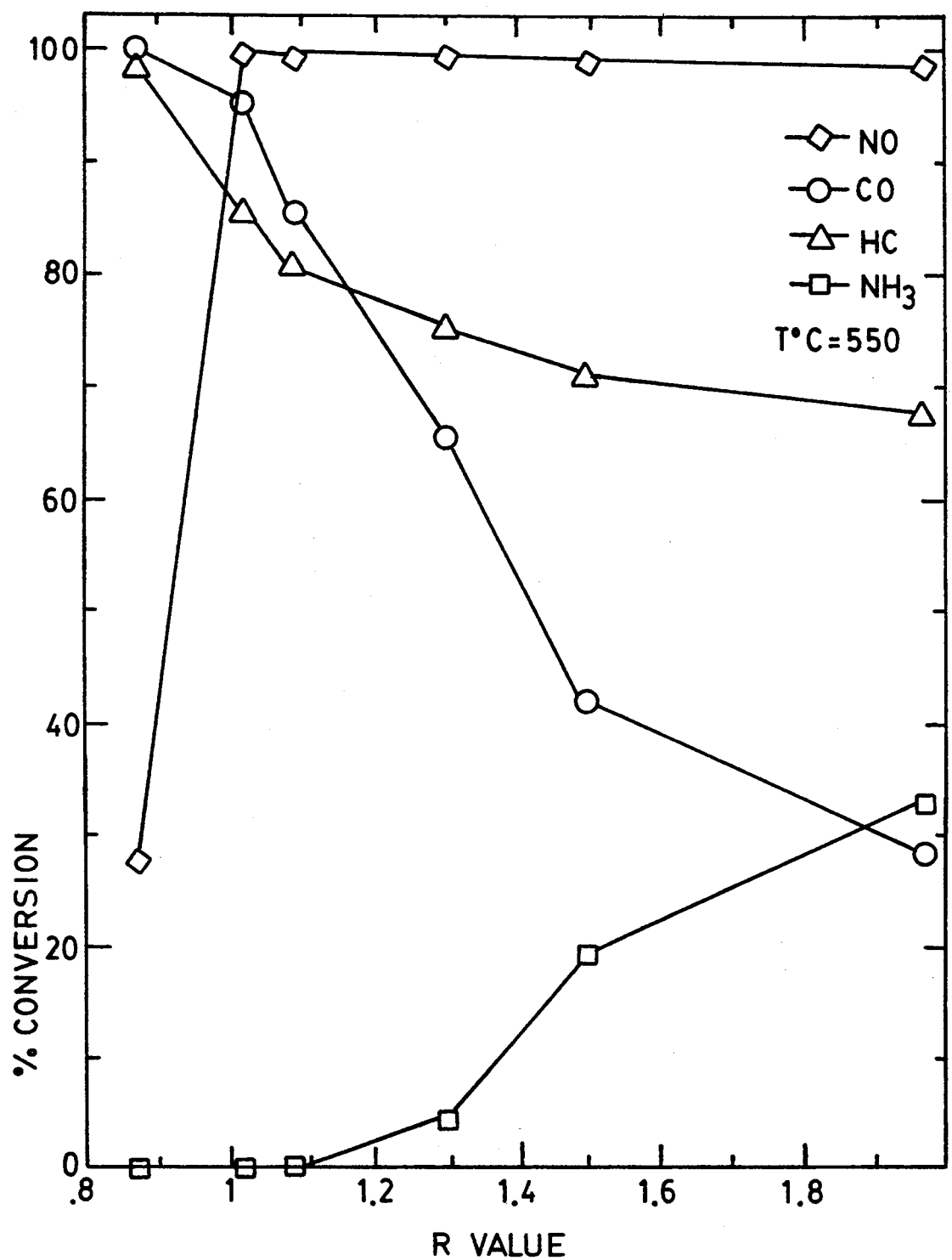
FIG. 3 is a graph which shows a R-curve for a washcoat/catalyst on a honeycomb substrate where the washcoat is provided according to a first embodiment of the present invention.
Figure 4:
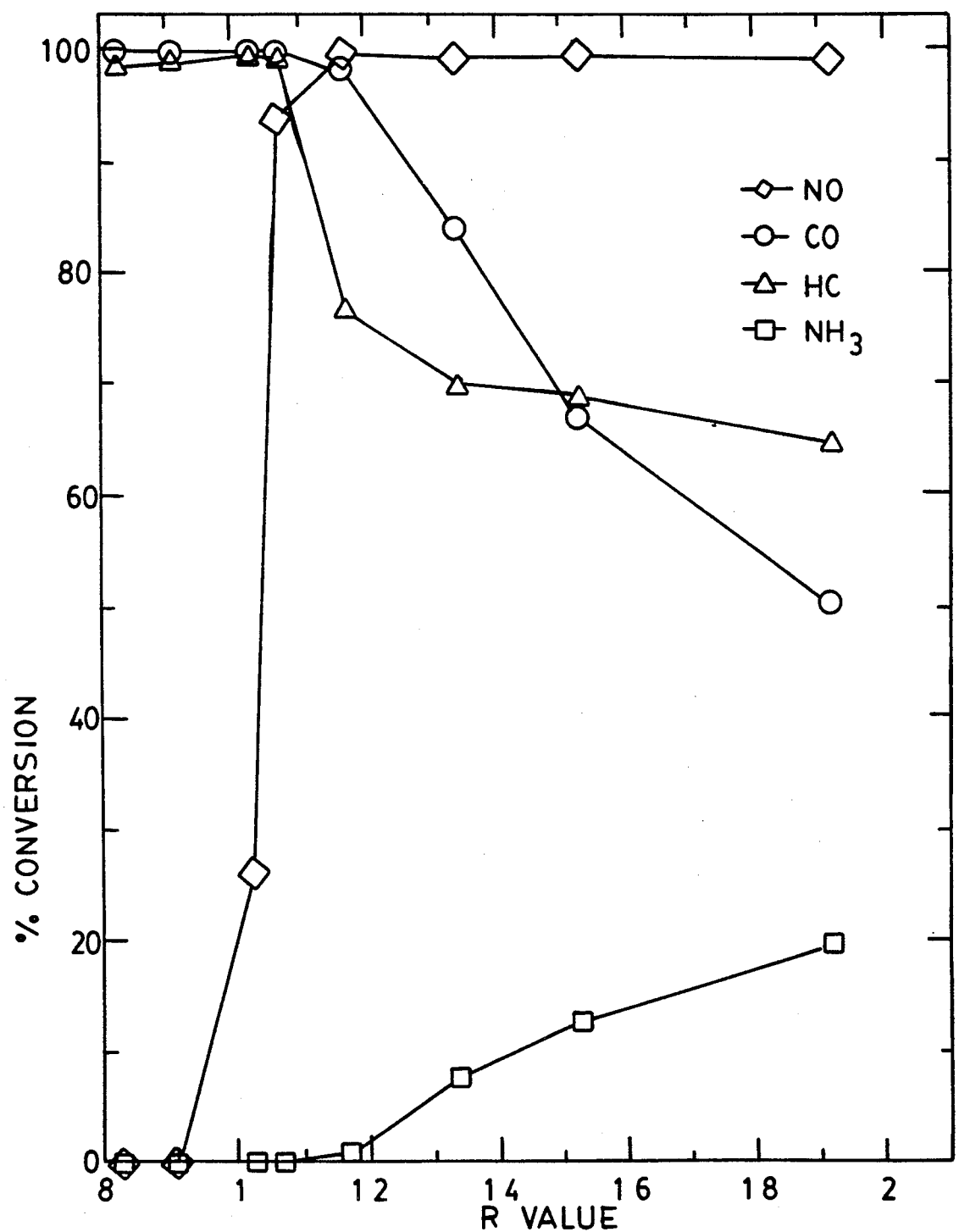
FIG. 4 is a graph which shows a R-curve for a washcoat/catalyst employing the substrate and catalyst of FIG. 3 and a commercially available washcoat.

A commercial platinum/palladium catalyst is placed on the washcoat by dipping the calcined washcoat in an aqueous solution of the nitrates of the catalyst. Thereafter the impregnated washcoat is calcined at 500° C. for 2 hours. This catalyst system is tested on a flow reactor for hydrocarbon and carbon monoxide oxidation and nitrogen oxide reduction. FIG. 3 shows an R-curve (explained below) for the washcoat/catalyst prepared according to this example. In contrast, FIG. 4 shows an R-curve for a commercially available washcoat/catalyst using the same catalyst. The R in these figures is obtained by dividing the sum of the equivalent reducing components of the mixture by the sum of the oxidizing components and can be calculated according to the following formula:

$$R = \frac{p_{CO} + p_{H_2} + 3np_{C_nH_{2n}} + 3.33np_{C_nH_{2n+2}}}{p_{NO} + 2p_{O_2}}$$

R=1 is a stoichiometric gas mixture. The R curves of FIGS. 3 and 4 are comparable showing that an equally effective catalysis was obtained from the present invention thinner washcoat. An improvement is seen in hydrocarbon oxidation in the present invention system. Due to the more open channels of the present invention system, problems with back pressure typical of conventionally washcoated honeycomb catalyst systems is avoided.

EXAMPLE 2

A γ-alumina washcoat is provided on a honeycomb substrate according to the procedure of Example 1. Afterwards the coated substrate is dipped into a barium nitrate solution. The coating is dried at 100° C. for 30 minutes and then calcined at 600° C. for 2 hours. This changes the mixture of washcoat to 5% barium oxide and 95% of the alumina. Barium is known to provide high temperature stabilization to alumina materials. The small amount of barium does not change the channels in honeycomb substrate significantly and the channels remain similar to the one described in Example 1.

EXAMPLE 3

A solution of freshly distilled aluminum tris-(2-propoxide) (1.0M) is prepared in 2-propanol. A honeycomb substrate is dipped into the solution. After blowing-out excess solution using nitrogen gas, the substrate is exposed to atmospheric humidity, dried at 80° C. to remove 2-propanol and calcined at 600° C. The channels are of uniform thickness as in Example 1.

We claim:

1. A method of providing a washcoat uniformly comprising oxides uniformly distributed in γ-alumina on a channeled substrate as a supporting structure for an exhaust gas conversion catalyst comprising:
    (a) applying a coating of a reactive mixture, consisting of aluminum alkoxide, at least one salt of barium and cerium, a solvent, and a complexing acid to promote a clear sol to said channeled substrate, said aluminum alkoxide having a chemical formula of $Al(OR)_3$, wherein R comprises an alkyl group of branched alkyl group having between 3 and 6 carbon atoms;
    (b) after removing excess coating from said channels by blowing gas through said channels, hydrolizing said coating;
    (c) drying said coating on said channeled substrate at a temperature sufficient to remove solvent; and
    (d) calcining said coating at a temperature to density said coating to form said washcoat comprising γ-alumina.

2. The method according to claim 1 wherein said method comprises repeating steps (a) through (c) until a coating of desired surface area is obtained and then calcining the resultant coating.

3. The method according to claim 1 wherein said method comprises repeating steps (a) through (d) in order until a coating of desired surface area is obtained.

4. The method according to claim 1 wherein said aluminum alkoxide comprises aluminum tris(sec-butoxide) and said solvent is water.

5. The method according to claim 1 wherein said channeled substrate comprises a ceramic honeycomb structure.

6. The method according to claim 5 wherein said gas is an air/nitrogen mixture.

7. The method according to claim 1 wherein said salts of said reactive mixture are alkoxides selected from the group consisting essentially of (a) barium alkoxide, (b) cerium alkoxide, and (c) mixtures of barium alkoxide and cerium alkoxide.

8. The method according to claim 1 wherein said washcoat on said substrate is impregnated with a catalyst.

9. An article resulting from the practice of the method of claim 1.

10. An article resulting from the practice of the method of claim 8.

11. A method of providing a γ-alumina comprising washcoat on a channeled substrate as a supporting structure for an exhaust gas conversion catalyst comprising:
    (a) applying a coating of a reactive mixture made from aluminum alkoxide, at least one of barium or cerium alkoxide and alcohol vaporizable at or below 100° C. to said channeled substrate, said aluminum alkoxide having a chemical formula of $Al(OR)_3$, wherein R comprises an alkyl group or branched alkyl group having between 3 and 6 carbon atoms;
    (b) removing excess coating from said channels by blowing gas through said channels;
    (c) exposing said coating to water vapor;
    (d) drying said coating on said channeled substrate at a temperature sufficient to remove alcohol and/or water; and
    (e) calcining said coating at a temperature to densify said coating to form said washcoat comprising γ-alumina and barium or cerium oxides.

12. The method according to claim 11 wherein said method comprises repeating steps (a) through (d) until a coating of desired surface area is obtained and then calcining the resultant coating.

13. The method according to claim 11 wherein said method comprises repeating steps (a) through (e) in order until a coating of desired surface area is obtained.

14. The method according to claim 11 wherein said channeled substrate comprises a ceramic honeycomb structure.

15. The method according to claim 11 wherein said gas is nitrogen.

16. The method according to claim 11 wherein said washcoat on said substrate is impregnated with a catalyst.

17. An article resulting from the practice of the method of claim 11.

18. An article resulting from the practice of the method of claim 16.

* * * * *